United States Patent
Satou et al.

(10) Patent No.: US 6,380,884 B1
(45) Date of Patent: Apr. 30, 2002

(54) RADAR APPARATUS

(75) Inventors: Kazuhisa Satou; Ken-i-chi Tohya; Takashi Sugawara, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/481,068

(22) Filed: Jan. 11, 2000

(30) Foreign Application Priority Data

Jan. 13, 1999 (JP) ............................................. 11-006210

(51) Int. Cl.[7] .......................... G01S 13/93; G01S 13/48
(52) U.S. Cl. ....................... 342/70; 342/147; 342/155; 342/195
(58) Field of Search ............................. 342/27, 28, 70, 342/71, 72, 104, 105–115, 118, 127–133, 165, 192–197, 159, 25, 155–158, 147

(56) References Cited

U.S. PATENT DOCUMENTS

| | | | |
|---|---|---|---|
| 4,989,008 A | * | 1/1991 | Fujisaka et al. ............... 342/25 |
| H1181 H | * | 5/1993 | Rihaczek ...................... 342/25 |
| 5,751,211 A | | 5/1998 | Shirai et al. |
| 5,754,099 A | | 5/1998 | Nishimura et al. |
| 6,023,235 A | * | 2/2000 | Sauer ........................... 342/25 |

* cited by examiner

Primary Examiner—Bernarr E. Gregory
(74) Attorney, Agent, or Firm—Armstrong, Westerman & Hattori, LLP (57) ABSTRACT

A radar apparatus is provided that can correctly extract the necessary point for a determination related to the safe travel of one's automotive vehicle among objects such as automotive vehicles moving at an angle in front and constructed objects. The radar apparatus of the present invention provides antennas that transmit beams in a plurality of directions and receive the reflected waves from objects as received signals. The objects that generated these reflected waves are detected. In addition, this radar apparatus provides a reflected location detection device that detects the reflected locations that are the generation source of the reflected waves for this plurality of directions, a grouping device that groups each of these detected reflected locations into a group of single or plural reflected locations assuming they belong to the same object, and a device that extracts reflected locations having the shortest distance from the moving body from among these grouped reflected locations to serve as reference points related to the safe travel of this moving body.

11 Claims, 5 Drawing Sheets

RADAR APPARATUS

BACKGROUND OF THE INVENTION

1. Field of the Invention

The present invention relates to a radar apparatus used, for example, in collision prevention systems in automotive vehicles.

2. Description of the Related Art

As an essential component of, for example, a collision prevention system for automotive vehicles, radar apparatuses for automotive vehicles that detect the distance to an object such as an automotive vehicle in front or an oncoming automotive vehicle are being developed. Recently, electronic scanning-type and mechanical scanning-type radar apparatuses are being developed that can detect not just the distance to the object, but the direction of an object seen from one's automotive vehicle.

The electronic scanning-type radar apparatus is structured so as to have a plurality of adjacent antenna apparatuses, arranged with their orientations slightly offset, that transmit beams in different directions and receive the reflected waves. For each antenna apparatus, emission and reception of the beams offset in time are carried out in sequence. Thereby, whether or not reflected waves are generated is detected by any antenna, which is to say, from any direction. Not only this multi-beam time-sharing type radar, but also the mechanical scanning-type radar, which mechanically biases the orientation of the transceiver antennas, can detect the direction of the object producing the reflected waves.

In Japanese Patent No. 2567332 (corresponding U.S. Pat. No. 5,448,244) of the present applicants, for example, a method is disclosed wherein weighted equalization processing of the reception levels of the reflected waves in each direction is carried out, and the direction of the object that generated the reflected waves is detected with high precision. As a result of the increased space resolution in two dimensional space, this kind of scanning-type radar apparatus for an automotive vehicle not only detects whether or not there is an obstruction, but detects the approximate shape and dimensions of the obstruction, analyzes them with a computer, and carries out more precise automatic determination of traffic safety.

For example, the next goal will be automatically determining whether or not an automotive vehicle at an angle in front (in the adjacent lane) travelling forward can be passed safely, without a rear end collision or contact, by combining a high resolution radar apparatus and a computer. That is, referring to FIG. 10, the reflected waves generated at the plurality of locations on the automotive vehicle travelling in front at an angle to one's automotive vehicle are detected by a scanning-type radar apparatus mounted on near the front of one's automotive vehicle.

Figure 10:
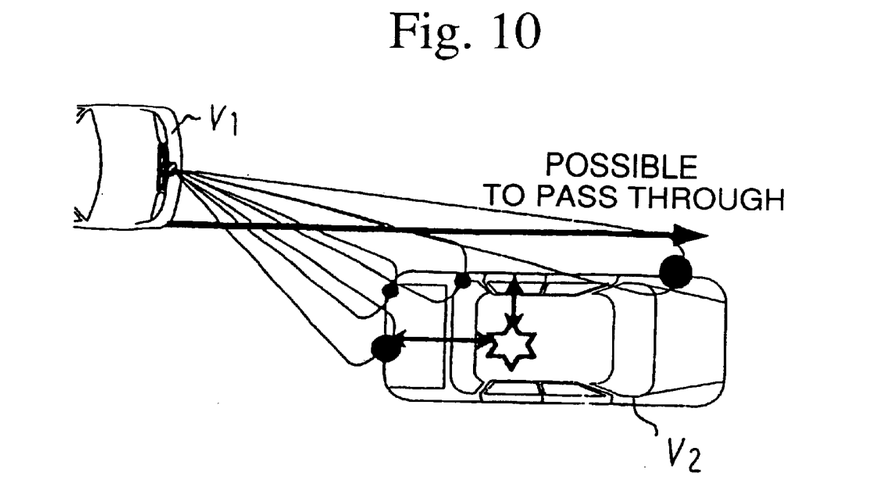
FIG. 10 is a conceptual drawing for explaining an example of the radar apparatus detecting an automotive vehicle at an angle in front travelling forward to one's automotive vehicle and making a determination of save travel in conventional technology.

The direction of each reflected location that generated reflected waves is detected from the direction of emission of the beams, and the distance to each of location is detected by the time from the emission of the beam to the reception of the reflected wave. In addition, the level of the received signal of the reflected wave generated at each reflected location is indicated by the size of the black circle shown at each of the reflected locations. When weighted equalization processing is carried out for the direction and distance of each reflected location based on the level of the received signal of the corresponding reflected wave, the position of the center of gravity, indicated by the star-shaped mark, is detected. This center of gravity represents the position of the object.

Figure 11:
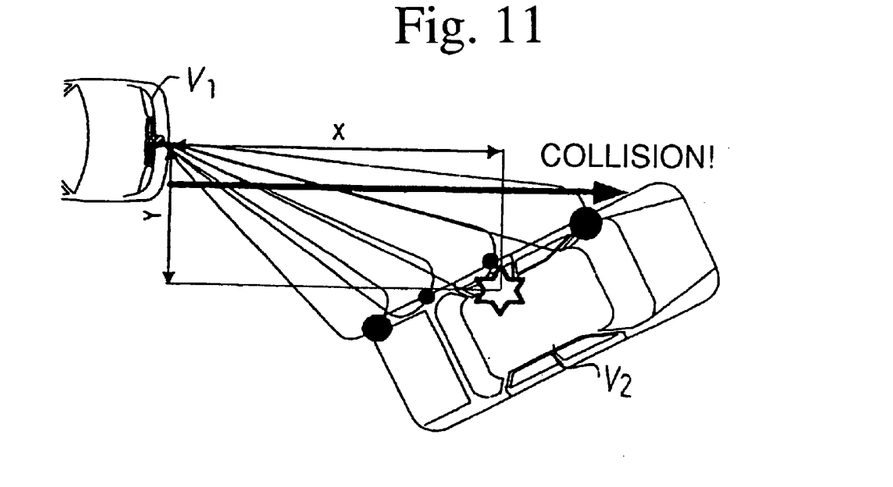
FIG. 11 is a conceptual drawing for explaining an example of the radar apparatus detecting an automotive vehicle at an angle in front travelling forward to one's automotive vehicle and making a determination of save travel in conventional technology.

As shown in FIG. 10, in the case of an automotive vehicle at an angle in front travelling forward is running in the same direction as one's automotive vehicle, as a result of detecting the position by the radar apparatus based on calculating the center of gravity, the computer determines if is possible to pass or edge past based on the approximate width of one's automotive vehicle and the other automotive vehicle. However, as shown in FIG. 11, in the case that the direction of travel of the automotive vehicle at an angle in front travelling forward is crossing the direction of travel of one's automotive vehicle, the possibility of edging past cannot be determined only from the result of calculation of the position of the center of gravity described above and the widths of one's automotive vehicle and the other automotive vehicle.

Figure 12:
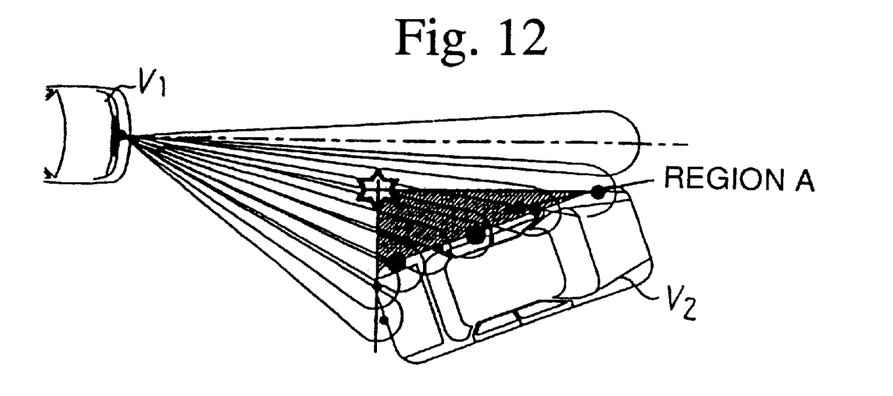
FIG. 12 is an explanatory drawing for explaining an example conceived by developing the conventional technology for detecting an automotive vehicle at an angle in front travelling forward with respect to one's automotive vehicle, and making a determination of safe travel.

In this connection, as an example of a countermeasure for the case that the direction of travel of the automotive vehicle in front, as described above, is different from that of one's automotive vehicle, the employment of the method of determination as shown in FIG. 12 has been conceived. In this method, a line perpendicular to the direction of travel of one's automotive vehicle is drawn from the location detected to be nearest to one's automotive vehicle, and at the same time, a line parallel to the direction of travel of one's automotive vehicle is drawn from the location detected to be farthest from one's automotive vehicle. The intersection of the perpendicular and parallel lines is detected, and serves as the location nearest to one's automotive vehicle, and includes a margin (the degree of clearance for safety).

In addition, the safety of passing is determined from the nearest location detected in this manner and the width of one's automotive vehicle. In the case that passing is unsafe, a warning is issued to the driver. This is the also identical to the case that there is a structure such as a guard rail, instead of the above-described automotive vehicle, in front.

In the method of detection of an object at an angle in front is explained referring to FIG. 12, there is the problem that the margin becomes extremely large, and cannot be put into practical use, in the case that the automotive vehicle in front has a large total length, such as a truck. Therefore, it is an object of the present invention to provide a radar apparatus that detects more accurately the necessary points in a determination related to the safe travel of one's automotive vehicle among objects such as automotive vehicles at an angle in front travelling forward and structures.

Another object of the present invention is to provide a radar apparatus that can precisely detect the profile of an object at an angle that is crossing the direction of travel of one's automotive vehicle.

SUMMARY OF THE INVENTION

The radar apparatus of the present invention for solving the above-described problem in the conventional technology provides a reflected location detection device that detects the generation source of the reflections (referred to hereinafter as the "reflected locations") for each of a plurality of directions, a device that groups each of the detected reflected locations into groups of singular or plural reflected locations assuming them to be included in an identical object, and a device that detects the reflected location having shortest distance from one's automotive vehicle among the grouped reflected locations to serve as the reference point related to the safe travel of one's automotive vehicle.

The radar apparatus of the present invention for solving the problems in the above-described conventional technology provides a reflected location detection device that detects the generation source of the reflections for each of a plurality of directions, a device that groups each of the detected reflected locations into groups of singular or plural reflected locations assuming them to be included in an identical object, and a line segment extraction device that extracts from the arrangement of the grouped reflected locations line segments that form a profile of the object.

The radar apparatus of the present invention for solving the problems in the above-described conventional technology provides are a reflected location detection device that detects the reflected locations for each of a plurality of directions, and an unnecessary data elimination device that detects from among detected reflected locations the reflected locations having a lower reception level, equal to or greater than a predetermined value, than the reflected locations detected as reflected locations having an identical distance in single of plural adjacent directions, and the reflected locations having the reception level lower than a pre-determined threshold value in these directions are considered unnecessary data in these directions.

DETAILED DESCRIPTION OF THE INVENTION

According to an appropriate embodiment of the present invention, a device is provided that detects the point of closest distance from a moving body in a profile formed by extracted line segments as the reference point related to the safe progress of this moving body. In addition, a segment extraction device is structured in such a manner that a segment is extracted so that the length of a perpendicular line drawn from each of the extracted reflection points to the line segment of the extracted object is weighted according to the received signal level of the corresponding reflected wave, and the total summation of the addition for each reflected location is minimized.

According to an appropriate embodiment of the present invention, the determination of unnecessary data is carried out as an additional condition for determining whether among any of the extracted reflected locations, ones having a high reception level and different distance as compared to candidate unnecessary data are included. Furthermore, the reflected body causing the appearance of the unnecessary data is determined to have a profile in which it is crossing the direction of progress of one's automotive vehicle.

Figure 9:
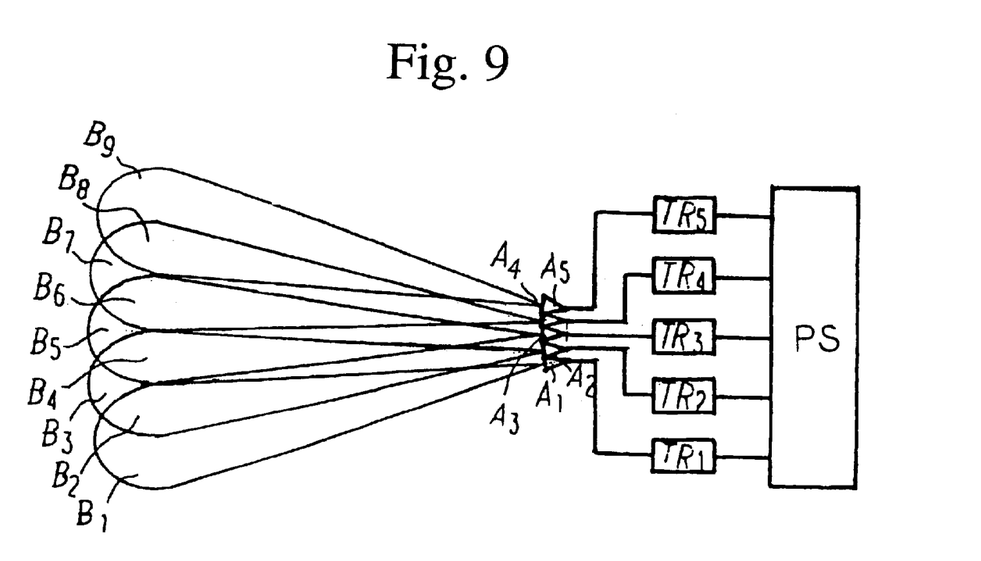
FIG. 9 is a functional block drawing showing an example of the structure of the radar apparatus of this embodiment.

FIG. 9 is a function block drawing showing the general structure of the data apparatus for a car according to an embodiment of the present invention, and A1 through A5, for convenience of display, are antennas illustrated by antennas for both transmitting and receiving, TR1 through TR5 are signal transceiving circuits, and PS is a processor.

The five antennas A1, A2, ..., A5 are installed at the front of the automotive vehicle so that their directions are slightly offset in the order of their arrangement, and the beams B1, B2, ..., B5 transmitted from each antenna are arranged so that the adjacent beams are partially overlapping. Based on the control of the processor PS, a transmitted signal generated by one of the signal transceiving circuits TR1~TR5 is transmitted as a signal beam from a corresponding antenna A1~A5. Reflected waves generated by objects in front of the automotive vehicle, such as the automotive vehicles in front, oncoming automotive vehicles, guard rails at the shoulder of the road, etc., are received from the one antenna A1~A5 that transmitted the transmitted beam or is adjacent thereto, and supplies this to the corresponding signal transceiving circuit.

The processor PS controls the timing of the transmitted and received signal that is carried out using time-sharing by the five above-mentioned signal transceiving circuits TR1~TR5, and at the same time, receives and processes the information related to the reflected waves obtained by the signal transceiving circuits TR1~TR5 of each of the signal transceiving channels. For example, If this radar apparatus is an FM radar apparatus that transmits an FM signal and receives the reflected waves, the processor PS receives the frequency and amplitude (level) of a beat signal generated by the mixing of the local signal that split the transmitted signal and the reflected waves as information related to the received reflected wave. The frequency of this beat signal indicates the distance to the object, and the level of the beat signal indicates the reception level of the reflected wave.

In the transmission and reception operation by the five signal transceiving circuits, as is disclosed in Japanese Patent No. 2567332, by the present applicants, includes the operation w herein a beam is transmitted from an arbitrary antenna and the reflected wave due to the object is received by the same antenna, and the operation wherein a beam transmitted from an arbitrary antenna and the reflected wave due to the object is received by another adjacent antenna. That is, by including transmission and reception operations that use different transmission and reception antennas, the structure becomes equivalent to adding four virtual antennas between each of the adjacent antennas.

In the radar apparatus of the embodiment shown in FIG. 9, all together, nine beams B1, B2, B3, . . . , B9, are transmitted in each direction from nine antennas, including the four virtual antennas, and the reflected waves due to the object are received. Below, the nine parts of the signal transceiving system, corresponding to each of the beams, are denoted by signal transceiving channels #1~#9.

Figure 1:
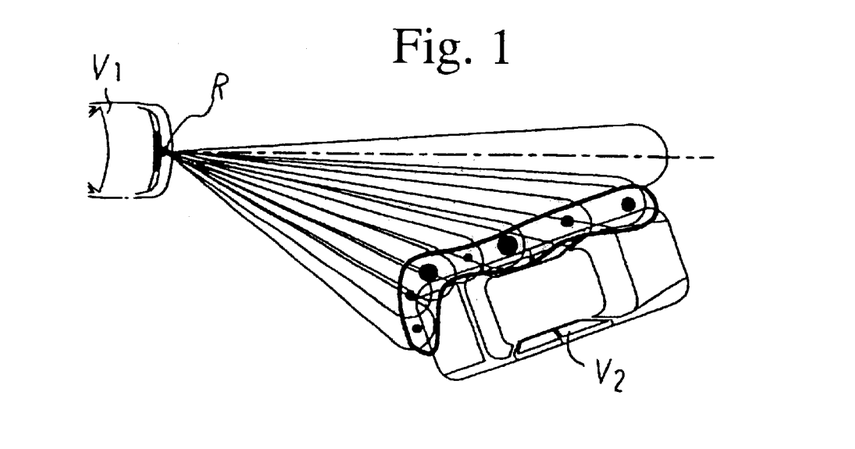
FIG. 1 is a conceptual drawing for explaining the method of grouping the reflected locations carried out by the radar apparatus of an embodiment of the present invention.

FIG. 1 shows an example wherein the time-sharing multi-channel radar apparatus having the structure shown in FIG. 9 is mounted at the front end of one's automotive vehicle, and the automotive vehicle at an angle in front travelling forward with respect to one's automotive vehicle is detected by electronic scanning using the above-described nine signal transceiving channels. The direction of each reflected location generating reflected waves is detected by the identification number of the signal transceiving channel, and the distance to each of the reflected locations is detected by time from the transmission of the beam to the reception of the reflected wave. In addition, the level of the received signal of the reflected wave generated at each reflected location is shown by the size of the black circles showing each reflected location.

The processor first carries out grouping for each of the reflected waves detected by transmitting and receiving the beam signal. This grouping is carried out by dividing each of these reflected locations into single or plural reflected location groups assumed to be included in an identical object. Any suitable method can be adopted to carry out this grouping.

Figure 2:
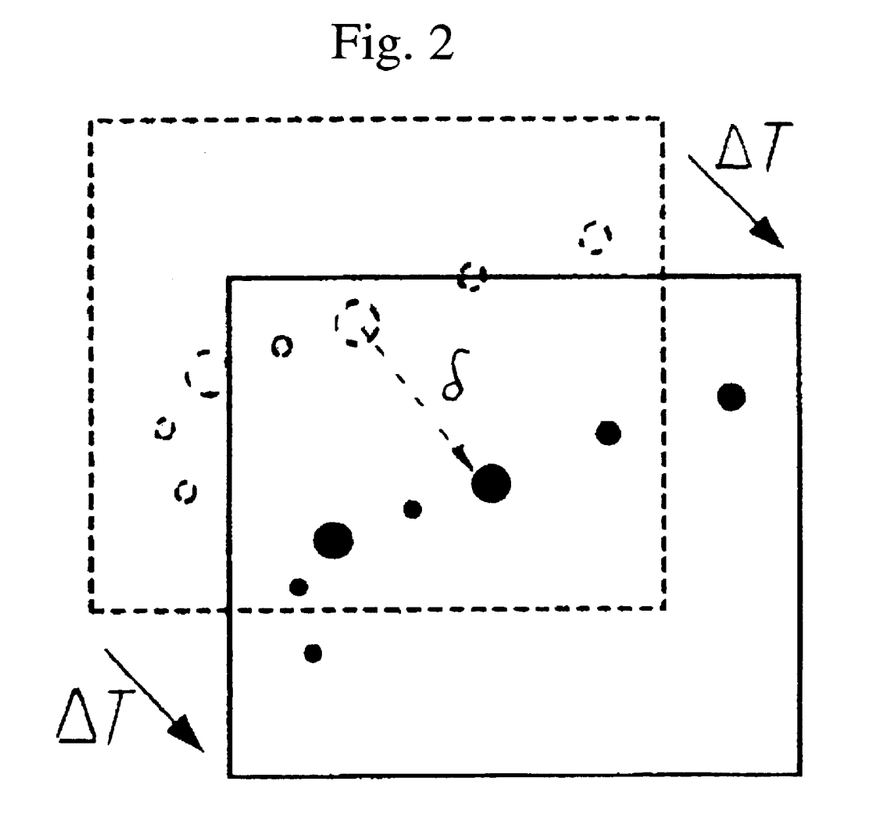
FIG. 2 is a conceptual drawing for explaining one example of a specific method for grouping the reflected locations carried out by the radar apparatus.

In an example shown in FIG. 2, based on a set of reflected locations within a two dimensional space having unchanging relative positional relations over the course of an appropriate time ΔT, this set of reflected locations is treated as included in an identical object, and are grouped so as to be included in one group. Specifically, the amount of displacement within time ΔT for reflected locations whose reflected waves have the highest reception level are detected, the remaining reflected locations are then given the same amount of displacement, and among each of the reflected locations that have received this displacement amount, only those corresponding to the positions of the reflected locations actually measured after ΔT are extracted, and are grouped so as to be included in a common group.

Figure 3:
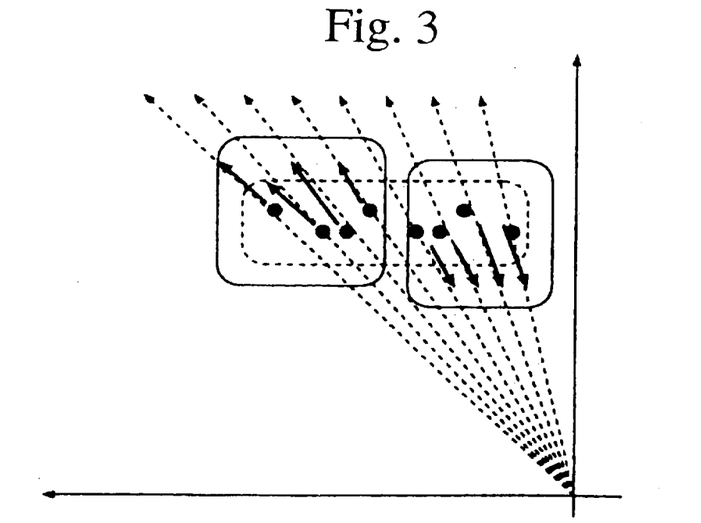
FIG. 3 is a conceptual drawing for explaining one example of a specific method for grouping the reflected locations carried out by the radar apparatus.

Another grouping method is based on relative velocity, as shown in FIG. 3. That is, for each of the reflected locations, the relative velocity of each reflected location with respect to one's automotive vehicle is detected, and the groups of reflected locations having almost equal relative velocity are grouped in the same group. In the example in FIG. 3, these are grouped into two groups respectively having almost identical relative velocities. The relative velocity with respect to one's automotive vehicle can be detected from the rate of change over time of the relative distance, or detected, for example, from the Doppler shift in the frequency of the reflected wave.

Figure 4:
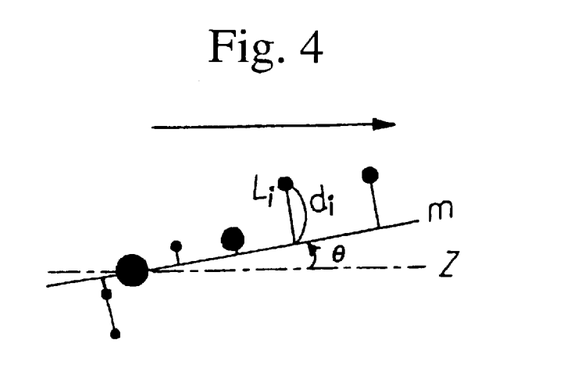
FIG. 4 is a conceptual drawing for explaining an example of the specific method for extracting a line segment from the grouped reflected locations carried out by the radar apparatus.

When the grouping as described above is completed for the plurality of detected reflected locations, the processor PS starts the processing that extracts the line segments from each reflected location included in a group. First, as shown in FIG. 4, the processor PS establishes a straight line Z (shown in the figure with the dotted line) that is parallel to the direction of travel of one's automotive vehicle, shown by the arrow, and passes through the reflected locations whose reflected wave reception level is the highest.

Next, the processor PS establishes a straight line having a pre-determined angle θ with respect to the above-described straight line Z, and draws a perpendicular line di from each of the reflected locations on this straight line m. In addition, the processor PS calculates the summation $W(\theta)=\Sigma_i^n(Li \times di)$, which adds each reflected location while weighting the length of each perpendicular line di by the reception level Li of the corresponding reflected wave. While slightly varying θ, the processor PS detects the angle θ at which the summation W is minimized by iterating the established straight line m and the computation of the above summation W. The processor PS determines the straight line m whose angle θ minimizes this summation W.

Figure 5:
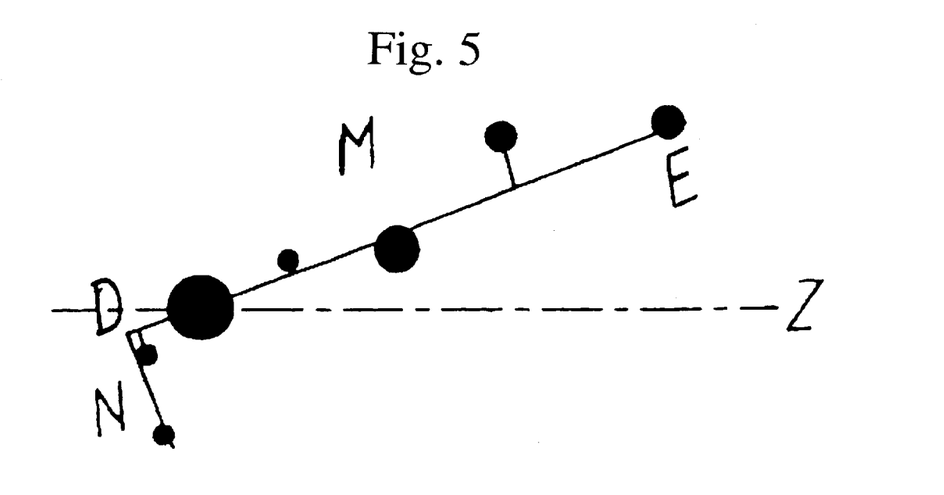
FIG. 5 is a conceptual drawing for explaining an example of the specific method for extracting a line segment from the grouped reflected locations carried out by the radar apparatus.

The processor PS extracts the reflected location having the shortest distance and the reflected location having the longest distance from one's automotive vehicle that are on line segment m, and these are used as the end points D and E of the line segment M. Next, the processor PS extracts one more line segment N by carrying out processing identical to that for extracting line segment M. The processor PS determines the end points of the object to be the respective intersections where the line segments M and N cross at approximately a right angle.

Figure 6:
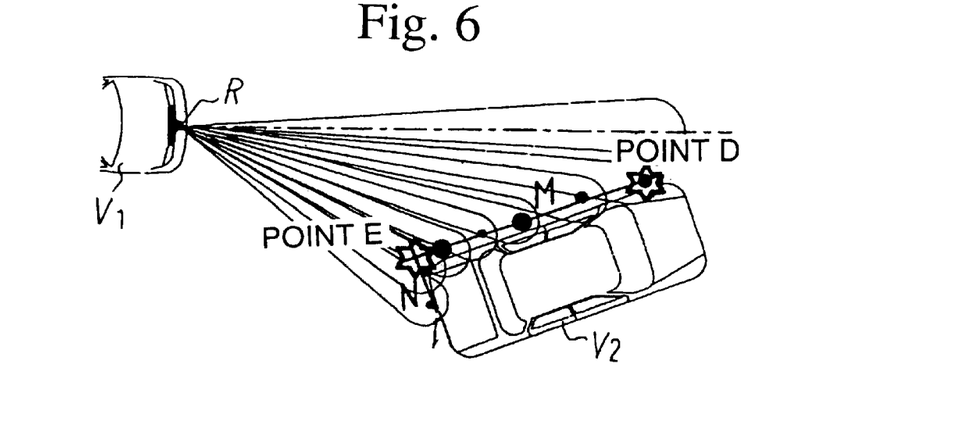
FIG. 6 is a conceptual diagram for explaining an example of the profile of the object obtained by the grouping and a line segment extraction according to this radar apparatus.

For the automotive vehicle at an angle in front travelling forward that is shown in FIG. 1, the relationship between the two line segments M and N that form the profile extracted as above and the actual profile of this automotive vehicle in front is shown in FIG. 6. The processor PS detects the point having the shortest distance (in this example, the end point D) from one's automotive vehicle based on the profile formed by the two line segments M and N to be the reference point related to the safety of the travel. In this manner, by detecting the point having the closest distance based on the profile obtained by the statistical processing of each reflected location, the reliability of the data can be greatly increased. In addition, it is possible to detect with much greater accuracy the position of a point having the shortest distance when that point does not necessarily correspond to a single reflected location.

The processor draws a perpendicular line from each point on the line segment M to the line of projected travel at the center of one's automotive vehicle, and detects the position of the perpendicular line among these that has the shortest length, and this serves as the other reference point related to safe travel for one's automotive vehicle. In the example in FIG. 6, the end point of the line segment E is selected. From the relationship between the position of the end point E and the transverse width of one's automotive vehicle, the processor PS determines whether there is a danger of collision in passing the automotive vehicle in front without changing the direction of travel, and warns the driver about this. Even in the case that the profile is not crossing the projected line of travel of one's automotive vehicle, it is possible to make a structure wherein a warning is issued when the future profiles, (vector) that are calculated taking into account the relative velocities of both automotive vehicles, will cross.

Figure 7:
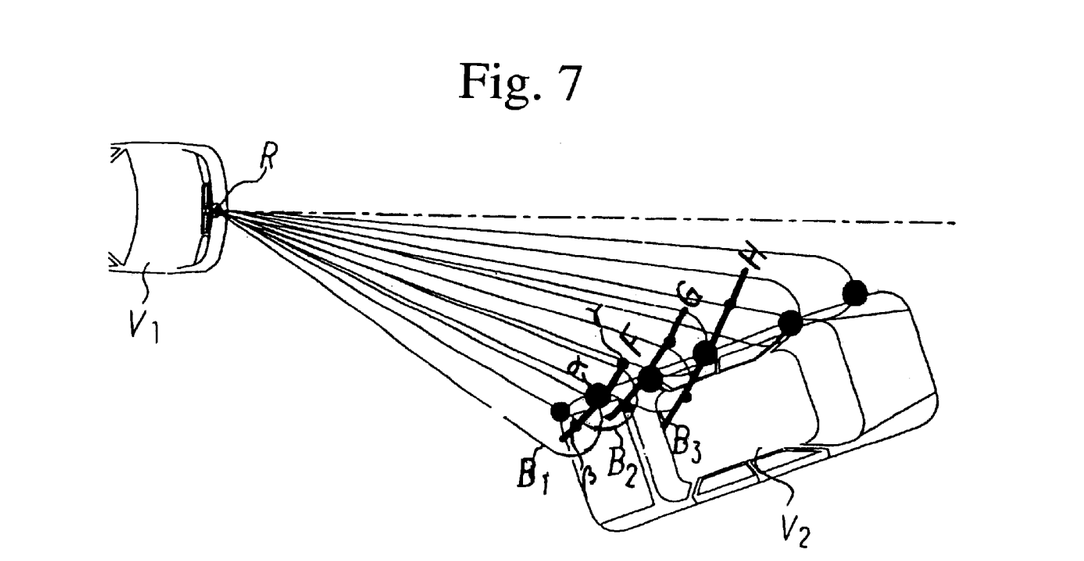
FIG. 7 is a conceptual drawing for explaining according to the positional relationship of each of the signal transceiving channels the appearance of the generation of unnecessary reflections that the radar apparatus carries out in order to increase the detection precision.

Next, a method of increasing the detection precision by eliminating unnecessary reflection points is explained referring to FIG. 7. Like the presentation heretofore, the position of the black circle indicates the reflected locations detected by the radar apparatus, and the size of the black points indicates the size of the reception level of the reflected wave. In the figures, F, G, and H are arcs centered on the radar apparatus mounted near the front of one's automotive vehicle, and each reflected location that is on the same arc has a relationship of equal distance from one's automotive vehicle.

In this example, several reflected locations indicated by the large black circles are detected at high reception levels near the center of the beams of the corresponding signal transceiving channels. At the same time, reflected locations identical to these are detected at low reception levels in the periphery of the beam of the adjacent signal transceiving channels.

For example, as shown in the figure, the reflected location a is detected by the high reception level in the central location of beam B2. In addition, in the respective peripheries of beam B1 and beam B3 on either side of beam B2, these reflected locations are also detected also as the reflected locations respectively having low reception levels.

However, these reflected locations are treated as being generated at the respective centers of beam B1 and beam B3, and as shown by black circles β and γ, and are indicated by small black circles at the central position of the adjacent beam. Therefore, it is impossible to distinguish whether the reflected waves are generated at the central part within each beam or generated at the periphery, and thus reflected waves generated within the beam are all treated as having been generated at the center of the beam.

Figure 8:
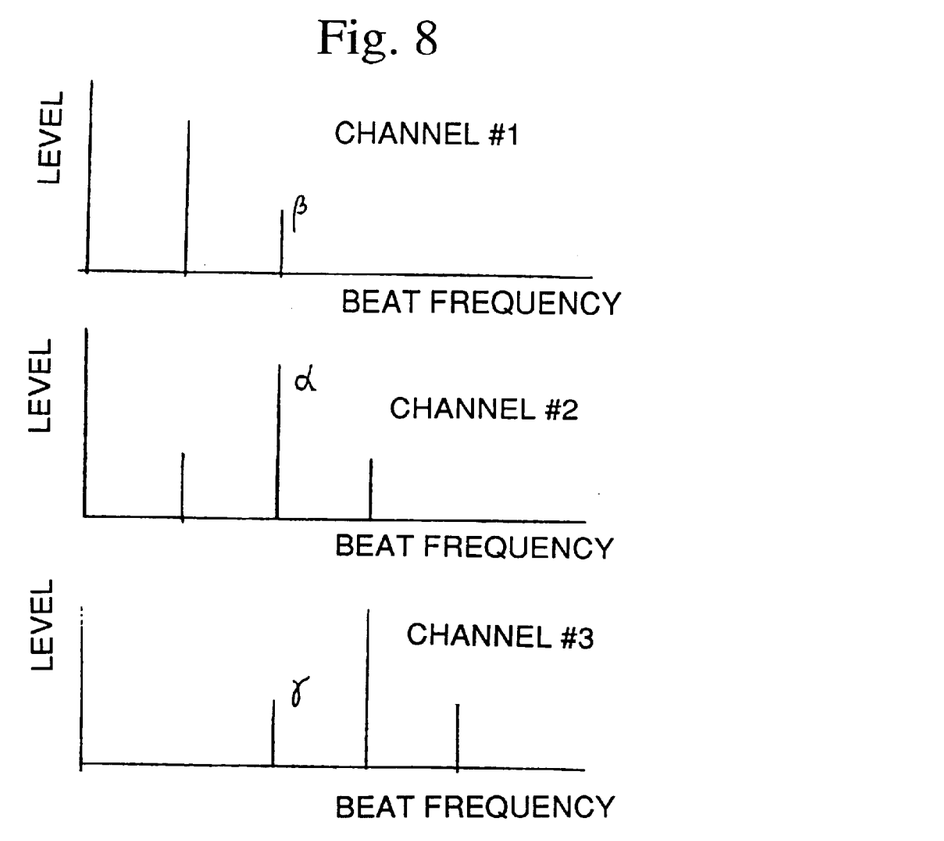
FIG. 8 is a conceptual diagram for explaining according the relationship of the received signals of each signal transceiving channel the appearance of the elimination of unnecessary reflected waves.

The positional relationship of the reflected locations illustrated in FIG. 7 are explained by the relation of the received signals in adjacent signal transceiving channels using as an example the case of an FM radar apparatus. In the case of an FM radar apparatus, a beam signal is generated by mixing the FM signal received as a reflected wave from the object with a part of the transmitted FM signal. The frequency of this beat signal indicates the distance to the object, and the level indicates the strength of the received reflected wave. One example of the mutual relationships between beat waves generated by the signal transceiver channel #2 and the signal transceiver channels #1 and #3 on either side thereof is shown in FIG. 8.

The beat signal α detected at signal transceiving channel #2 is detected at the adjacent signal transceiving channels #1 and #3 as the beat signals β and γ having the same frequency and a lowered level. The degree of this lowering of the level corresponds to the ratio η (dB) of the gain in the periphery of the beam with respect to the antenna gain in the center of each beam. Using this kind of property, it is possible to increase the detection precision by respectively eliminating from the signal transceiving channels #1 and #3 the beat signals β and γ having a reception level lower than the pre-determined ratio taking into account the ratio η of the gain within the beam, rather than the reception level of the beat signal α, as unnecessary signals.

Instead of making a predetermined ratio provided from the ratio η the determination standard for elimination, it is preferable to use a structure that eliminates β and γ as unnecessary signals by using as a standard being lower than a threshold value wherein the signal α having a distance equal to that of β and γ is detected by single or plural adjacent channels, and this value is provided for each direction.

Above, a structure that detects the point that is the shortest distance from one's automotive vehicle by profile lines in order to increase the reliability of the data and the precision of the position has been used as an example. However, if lowering the reliability of the data and the precision of the position slightly can be tolerated, rather than finding the profile line, it is also possible to detect the reflected location having the shortest distance from among the grouped reflected locations and use it as the point that is the closest to one's automotive vehicle.

In addition, the case of using an FM radar apparatus was taken as an example for explaining the present invention. However, the invention is not limited to an FM radar apparatus, and the invention can be applied to any other suitable type of radar apparatus, such as a pulse radar apparatus, an AM radar apparatus, or a laser radar apparatus.

In addition, the present invention was explained taking the case of being mounted on an automotive vehicle as an example. However, the radar apparatus of the present invention can be mounted on moving objects other than automotive vehicles, such as boats.

As explained in detail above, the radar apparatus of the present invention is a structure providing a device wherein each of the detected reflected locations is grouped assuming they belong to an identical body, the reflected locations having the shortest distance are detected from the arrangement of these grouped reflected locations, and line segments that form a profile of the object are extracted. Thereby, the locations that are the shortest distance from a body and the profile of the object can be detected, and the precision of each type of automatic detection related to safe travel can be greatly increased.

In addition, another radar apparatus of the present invention is a structure providing an unnecessary data elimination device that treats as unnecessary data reflected locations detected as reflected locations having a reception level higher than those with identical distances in the adjacent directions among each detected reflection points. Thereby, it is possible to detect with higher precision the profile of a body at an angle that is crossing the direction of travel forward of one's automotive vehicle.

What is claimed is:

1. A radar apparatus providing antennas that transmit beams in a plurality of directions and receive as reception signals the reflected waves from an object, and is mounted on a moving object that detects objects that generate these reflected waves, the radar apparatus comprising:

a reflected location detection device that detects the generation source of reflected waves, referred to hereinafter as reflected locations, for each of a plurality of directions;

a device for grouping each of said detected reflected locations into a group of a single or plural reflected locations from the same object; and a device that detects the reflected location having the shortest distance from this moving object from among said grouped reflected locations to serve as a reference point related to travel safety associated with this moving body.

2. A radar apparatus according to claim 1, wherein said moving body is a car and the transmission of a beam in said plurality of directions is carried out by time-sharing from a plurality of antennas arranged facing different directions.

3. A radar apparatus providing an antenna that transmits beams in a plurality of directions and receives as reception signals the reflected waves from an object, and is mounted on a moving object that detects objects that generate these reflected waves, the radar apparatus comprising:

a reflected location detection device that detects the reflected locations for each of a plurality of directions;

a device for grouping each of said detected reflected locations into a group of a single or plural reflected locations from the same object; and a line segment extraction device that extracts line segments that form the profile of a body from the arrangement of said grouped reflected locations.

4. A radar apparatus according to claim 3 wherein the radar apparatus comprises a device for extracting the point having the shortest distance from said moving object that is on the profile formed by said extracted line segments to serve as the reference points related to the safe travel of this moving body.

5. A radar apparatus according to claim 3, wherein the radar apparatus comprises a device that draws a line perpendicular from each point that is on said extracted line segments to the line of the expected travel of the center of said moving body, and that detects the point on this perpendicular line whose length is shortest to serve as the reference point related to the safe travel of said moving object.

6. A radar apparatus according to claim 3, wherein said line extracting device calculates each reflected location while weighting the length of the perpendicular line drawn from each of said reflected locations to the line segment of,said extracted object, and extracting said line segment so that the summation of these additions is minimized.

7. A radar apparatus according to claim 3, wherein the radar apparatus comprises a device that recognizes the points to which said two extracted line segments are nearly perpendicular as the end points of the object.

8. A radar apparatus providing an antenna that transmits beams in a plurality of directions and receives as reception signals the reflected waves from an object, and is mounted on a moving object that detects objects that generate these reflected waves, the radar apparatus comprising:

a reflected location detection device that detects reflected locations in each of said plurality of directions; and an unnecessary data elimination device that treats and eliminates as unnecessary data in these directions the reflected locations detected as reflected locations having an equal distance from the moving object in single or plural directions among said extracted reflection points and having a reception level that is lower than the pre-determined threshold value in the directions of the reflected locations.

9. A radar apparatus providing an antenna that transmits beams in a plurality of directions and receives as reception signals the reflected waves from an object, and is mounted on a moving object that detects objects that generate these reflected waves, the radar apparatus comprising:

a reflected location detection device that detects reflected locations in each of said plurality of directions; and an unnecessary data elimination device that treats and eliminates as unnecessary data in these directions the reflected locations having a reception level that is lower than the pre-determined value of reflected locations detected as reflected locations having an equal distance from the moving object in single or plural directions among said extracted reflection points.

10. A radar apparatus according to claim 9, wherein the determination of said unnecessary data being carried out having an additional condition for determining whether, among each of said detected reflected locations, reflected locations are included having a high reception level and different distance in comparison to candidate unnecessary data.

11. A radar apparatus according to claims 9, wherein the reflection body making said unnecessary data appear being determined to have a profile crossing or a vector that will cross the direction of progression of one's vehicle.

* * * * *